United States Patent
Okayama et al.

(10) Patent No.: US 7,424,332 B2
(45) Date of Patent: Sep. 9, 2008

(54) AUDIO SIGNAL PROCESSING APPARATUS AND RELATED COMPUTER PROGRAM

(75) Inventors: Kazuhito Okayama, Sagamihara (JP); Toshiharu Kuwaoka, Yokohama (JP); Isao Hijikata, Komae (JP); Ryouichi Nagata, Yamato (JP); Haruyuki Mori, Gunma-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 1073 days.

(21) Appl. No.: 10/703,588

(22) Filed: Nov. 10, 2003

(65) Prior Publication Data

US 2004/0098150 A1    May 20, 2004

(30) Foreign Application Priority Data

Nov. 13, 2002 (JP) .............................. 2002-329774

(51) Int. Cl.
*G06F 17/00* (2006.01)
*H04B 1/10* (2006.01)
*H04B 14/04* (2006.01)

(52) U.S. Cl. ......................................... 700/94; 375/254

(58) Field of Classification Search .................. 375/254; 704/502, 503; 381/29; 700/94; 333/14
See application file for complete search history.

(56) References Cited

U.S. PATENT DOCUMENTS 7,003,469 B2 * 2/2006 Okayama et al. ............ 704/502

* cited by examiner

*Primary Examiner*—Suhan Ni
*Assistant Examiner*—Andrew C Flanders
(74) *Attorney, Agent, or Firm*—Louis Woo

(57) ABSTRACT

An audio signal processing apparatus includes first and second tables. The first table has coefficients. The second table has corrective values for correction of the coefficients in the first table. The corrective values are assigned to different sample numbers in at least two successive half-wave signal portions. Detection is made as to a sample number in a corrected-object half-wave portion of a digital audio signal and a sample number in a half-wave portion of the digital audio signal which precedes the corrected-object half-wave portion. The coefficients in the first table are corrected into correction-resultant coefficients in response to the detected sample numbers while the corrective values in the second table are used. Samples in the corrected-object half-wave portion of the digital audio signal are corrected in response to the correction-resultant coefficients.

4 Claims, 11 Drawing Sheets

FIG. 5

| Fs2COUN | 3(=2Ps) | 4(=3Ps) | 5(=4Ps) | 6(=5Ps) | 7(=6Ps) | 8(=7Ps) | 9(=8Ps) | 10(=9Ps) | 11(=10Ps) | 12(=11Ps) | 13(=12Ps) | 14(=13Ps) | 15(=14Ps) | 16(=15Ps) |
|---|---|---|---|---|---|---|---|---|---|---|---|---|---|---|
| n=1 | 0 | 0 | 0 | 0 | 0 | 0 | 0 | 0 | 0 | 0 | 0 | 0 | 0 | 0 |
| n=2 | 1/1(α) | 1/1(α) | 1/1(α) | 1/1(α) | 1/1(α) | 1/1(α) | 1/1(α) | 1/1(α) | 1/1(α) | 1/1(α) | 1/1(α) | 1/1(α) | 1/1(α) | 1/1(α) |
| n=3 | — | −1/1(β) | 0 | 0 | 1/2(β) | 1/2(β) | 1/2(β) | 1/1(β) | 1/1(β) | 1/1(β) | 1/1(β) | 1/1(β) | 1/1(β) | 1/1(β) |
| n=4 | — | 1/1(θ) | −1/1(β) | 0 | 0 | 0 | 1/2(γ) | 1/2(γ) | 1/2(γ) | 1/2(γ) | 1/2(γ) | 1/2(γ) | 1/2(γ) | 1/2(γ) |
| n=5 | — | — | — | −1/1(β) | −1/2(γ) | −1/2(γ) | 0 | 0 | 1/2(θ) | 1/2(θ) | 1/2(θ) | 1/2(θ) | 1/2(θ) | 1/2(θ) |
| n=6 | — | — | — | — | −1/2(γ) | −1/1(θ) | −1/2(γ) | −1/1(θ) | 0 | 0 | 0 | 0 | 0 | 0 |
| n=7 | — | — | — | — | — | −1/1(θ) | −1/1(θ) | −1/1(δ) | −1/2(θ) | −1/2(θ) | 0 | 0 | 0 | 0 |
| n=8 | — | — | — | — | — | — | — | −1/1(ε) | −1/1(δ) | −1/1(δ) | −1/2(δ) | −1/2(δ) | −1/2(δ) | −1/2(δ) |
| n=9 | — | — | — | — | — | — | — | — | −1/1(ε) | −1/2(ε) | −1/2(ζ) | −1/2(ζ) | −1/2(ζ) | −1/2(ε) |
| n=10 | — | — | — | — | — | — | — | — | — | −1/1(ε) | −1/1(ζ) | −1/1(ζ) | −1/1(ζ) | −1/1(ζ) |
| n=11 | — | — | — | — | — | — | — | — | — | — | −1/1(η) | −1/1(η) | −1/1(η) | −1/1(η) |
| n=12 | — | — | — | — | — | — | — | — | — | — | — | — | — | — |
| n=13 | — | — | — | — | — | — | — | — | — | — | — | — | — | — |
| n=14 | — | — | — | — | — | — | — | — | — | — | — | — | — | — |
| n=15 | — | — | — | — | — | — | — | — | — | — | — | — | — | — |

FIG. 6

| Fs2COUN | 3(=2Ps) | 4(=3Ps) | 5(=4Ps) | 6(=5Ps) | 7(=6Ps) | 8(=7Ps) | 9(=8Ps) | 10(=9Ps) | 11(=10Ps) | 12(=11Ps) | 13(=12Ps) | 14(=13Ps) | 15(=14Ps) | 16(=15Ps) |
|---|---|---|---|---|---|---|---|---|---|---|---|---|---|---|
| n=1 | 0 | 0 | 0 | 0 | 0 | 0 | 0 | 0 | 0 | 0 | 0 | 0 | 0 | 0 |
| n=2 | −1/1(β) | −1/1(γ) | −1/1(γ) | −1/1(γ) | −1/1(δ) | −1/1(δ) | −1/1(δ) | −1/1(η) | −1/1(η) | −1/1(η) | −1/1(ι) | −1/1(α) | −1/1(α) | −1/1(α) |
| n=3 | — | 1/1(θ) | 1/1(θ) | 1/1(θ) | −1/2(ε) | −1/2(ε) | −1/2(ε) | −1/1(ι) | −1/1(ι) | −1/1(ι) | −1/1(κ) | −1/1(β) | −1/1(β) | −1/1(β) |
| n=4 | — | — | — | 0 | 0 | 0 | 0 | −1/2(κ) | −1/2(κ) | −1/2(κ) | −1/2(λ) | −1/2(γ) | −1/2(γ) | −1/2(γ) |
| n=5 | — | — | — | — | 1/2(ζ) | 1/2(ζ) | 1/2(ζ) | 1/2(λ) | 1/2(λ) | 1/2(λ) | −1/2(μ) | −1/2(θ) | −1/2(θ) | −1/2(θ) |
| n=6 | — | — | — | — | 1/1(η) | 1/1(η) | 1/1(η) | 1/1(μ) | 1/1(μ) | 1/1(μ) | 0 | 0 | 0 | 0 |
| n=7 | — | — | — | — | — | — | — | 1/1(ν) | 1/1(ν) | 1/1(ν) | 0 | 0 | 0 | 0 |
| n=8 | — | — | — | — | — | — | — | — | — | — | 1/2(τ) | 1/2(τ) | 1/2(τ) | 1/2(τ) |
| n=9 | — | — | — | — | — | — | — | — | — | — | 1/2(υ) | 1/2(υ) | 1/2(υ) | 1/2(υ) |
| n=10 | — | — | — | — | — | — | — | — | — | — | 1/1(χ) | 1/1(χ) | 1/1(χ) | 1/1(χ) |
| n=11 | — | — | — | — | — | — | — | — | — | — | 1/1(ψ) | 1/1(ψ) | 1/1(ψ) | 1/1(ψ) |
| n=12 | — | — | — | — | — | — | — | — | — | — | — | — | — | — |
| n=13 | — | — | — | — | — | — | — | — | — | — | — | — | — | — |
| n=14 | — | — | — | — | — | — | — | — | — | — | — | — | — | — |
| n=15 | — | — | — | — | — | — | — | — | — | — | — | — | — | — |

FIG. 7

| FS → | BANK NO. → 0 | 1 | 2 | 3 |
|---|---|---|---|---|
| 2(n=1) | 1/65535 | 1/65535 | 1/4 | 1/8 |
| 3(n=2) | 1/65535 | 1/65535 | 1/3 | 1/8 |
| 4(n=3) | 1/65535 | 1/65535 | 1/3 | 1/8 |
| 5(n=4) | 1/65535 | 1/65535 | 1/2 | 1/8 |
| 6(n=5) | 1/65535 | 1/2 | 1/2 | 1/8 |
| 7(n=6) | 1/65535 | 1/2 | 1/2 | 1/8 |
| 8(n=7) | 1/65535 | 1/4 | 1/65535 | 1/8 |
| 9(n=8) | 1/65535 | 1/4 | 1/65535 | 1/8 |
| 10(n=9) | 1/65535 | 1/4 | 1/65535 | 1/8 |
| 11(n=10) | 1/65535 | 1/2 | 1/65535 | 1/8 |
| 12(n=11) | 1/65535 | 1/2 | 1/65535 | 1/8 |
| 13(n=12) | 1/65535 | 1/2 | 1/65535 | 1/8 |
| 14(n=13) | 1/65535 | 1/2 | 1/65535 | 1/8 |
| 15(n=14) | 1/65535 | 1/2 | 1/65535 | 1/8 |
| 16(n=15) | 1/65535 | 1/2 | 1/65535 | 1/8 |

FIG. 8

| FS → | BANK NO. → 0 | 1 | 2 | 3 |
|---|---|---|---|---|
| 2(n=1) | 1/65535 | 1/8 | 1/8 | 1/8 |
| 3(n=2) | 1/65535 | 1/8 | 1/8 | 1/8 |
| 4(n=3) | 1/65535 | 1/8 | 1/8 | 1/8 |
| 5(n=4) | 1/65535 | 1/8 | 1/8 | 1/8 |
| 6(n=5) | 1/65535 | 1/65535 | 1/8 | 1/8 |
| 7(n=6) | 1/65535 | 1/65535 | 1/8 | 1/8 |
| 8(n=7) | 1/65535 | 1/65535 | 1/65535 | 1/8 |
| 9(n=8) | 1/65535 | 1/65535 | 1/65535 | 1/8 |
| 10(n=9) | 1/65535 | 1/65535 | 1/65535 | 1/8 |
| 11(n=10) | 1/65535 | 1/65535 | 1/65535 | 1/8 |
| 12(n=11) | 1/65535 | 1/65535 | 1/65535 | 1/8 |
| 13(n=12) | 1/65535 | 1/65535 | 1/65535 | 1/8 |
| 14(n=13) | 1/65535 | 1/65535 | 1/65535 | 1/8 |
| 15(n=14) | 1/65535 | 1/65535 | 1/65535 | 1/8 |
| 16(n=15) | 1/65535 | 1/65535 | 1/65535 | 1/8 |

FIG. 9

Pre2=0~1

| Pre1 ↓ \ Pre0 → | 0~1 | 2 | 3 | 4 | 5 | 6 | 7~16 |
|---|---|---|---|---|---|---|---|
| 0~1 | 3 | 3 | 3 | 3 | 3 | 3 | 3 |
| 2 | 3 | 3 | 3 | 1 | 1 | 1 | 1 |
| 3 | 3 | 3 | 3 | 1 | 1 | 1 | 1 |
| 4 | 3 | 1 | 1 | 1 | 1 | 1 | 1 |
| 5 | 3 | 1 | 1 | 1 | 1 | 1 | 1 |
| 6 | 3 | 1 | 1 | 1 | 1 | 1 | 1 |
| 7~16 | 3 | 1 | 1 | 1 | 1 | 1 | 1 |

FIG. 10

Pre2=2

| Pre1 ↓ \ Pre0 → | 0~1 | 2 | 3 | 4 | 5 | 6 | 7~16 |
|---|---|---|---|---|---|---|---|
| 0~1 | 3 | 3 | 3 | 3 | 3 | 3 | 3 |
| 2 | 3 | 3 | 3 | 1 | 1 | 1 | 1 |
| 3 | 3 | 3 | 3 | 1 | 1 | 1 | 1 |
| 4 | 3 | 1 | 1 | 1 | 1 | 1 | 1 |
| 5 | 3 | 1 | 1 | 1 | 1 | 1 | 1 |
| 6 | 3 | 1 | 1 | 1 | 1 | 1 | 1 |
| 7~16 | 3 | 1 | 1 | 1 | 1 | 1 | 1 |

FIG. 11

Pre2=3

| Pre1 ↓ \ Pre0 → | 0~1 | 2 | 3 | 4 | 5 | 6 | 7~16 |
|---|---|---|---|---|---|---|---|
| 0~1 | 3 | 3 | 3 | 3 | 3 | 3 | 3 |
| 2 | 3 | 1 | 3 | 1 | 1 | 1 | 1 |
| 3 | 3 | 3 | 3 | 3 | 1 | 1 | 1 |
| 4 | 3 | 1 | 3 | 1 | 1 | 1 | 1 |
| 5 | 3 | 1 | 1 | 1 | 1 | 1 | 1 |
| 6 | 3 | 1 | 1 | 1 | 1 | 1 | 1 |
| 7~16 | 3 | 1 | 1 | 1 | 1 | 1 | 1 |

FIG. 12

Pre2=4

| Pre1 ↓ \ Pre0 → | 0~1 | 2 | 3 | 4 | 5 | 6 | 7~16 |
|---|---|---|---|---|---|---|---|
| 0~1 | 3 | 3 | 3 | 3 | 3 | 3 | 3 |
| 2 | 3 | 1 | 1 | 1 | 1 | 1 | 1 |
| 3 | 3 | 1 | 1 | 3 | 1 | 1 | 1 |
| 4 | 3 | 1 | 3 | 3 | 3 | 1 | 1 |
| 5 | 3 | 1 | 1 | 3 | 1 | 1 | 1 |
| 6 | 3 | 1 | 1 | 1 | 1 | 1 | 1 |
| 7~16 | 3 | 1 | 1 | 1 | 1 | 1 | 1 |

FIG. 13

Pre2=5

| Pre1 ↓ \ Pre0 → | 0~1 | 2 | 3 | 4 | 5 | 6 | 7~16 |
|---|---|---|---|---|---|---|---|
| 0~1 | 3 | 3 | 3 | 3 | 3 | 3 | 3 |
| 2 | 3 | 2 | 2 | 2 | 2 | 2 | 2 |
| 3 | 3 | 2 | 2 | 2 | 2 | 2 | 2 |
| 4 | 3 | 2 | 2 | 2 | 3 | 2 | 2 |
| 5 | 3 | 2 | 2 | 3 | 3 | 3 | 3 |
| 6 | 3 | 2 | 2 | 2 | 3 | 2 | 2 |
| 7~16 | 3 | 2 | 2 | 2 | 3 | 2 | 2 |

FIG. 14

Pre2=6

| Pre1 ↓ \ Pre0 → | 0~1 | 2 | 3 | 4 | 5 | 6 | 7~16 |
|---|---|---|---|---|---|---|---|
| 0~1 | 3 | 3 | 3 | 3 | 3 | 3 | 3 |
| 2 | 3 | 2 | 2 | 2 | 2 | 2 | 2 |
| 3 | 3 | 2 | 2 | 2 | 2 | 2 | 2 |
| 4 | 3 | 2 | 2 | 2 | 2 | 2 | 2 |
| 5 | 3 | 2 | 2 | 2 | 2 | 2 | 3 |
| 6 | 3 | 2 | 2 | 2 | 2 | 3 | 3 |
| 7~16 | 3 | 2 | 2 | 2 | 2 | 3 | 3 |

FIG. 15

Pre2=7~16

| Pre1 ↓ \ Pre0 → | 0~1 | 2 | 3 | 4 | 5 | 6 | 7~16 |
|---|---|---|---|---|---|---|---|
| 0~1 | 3 | 3 | 3 | 3 | 3 | 3 | 3 |
| 2 | 3 | 2 | 2 | 2 | 2 | 2 | 2 |
| 3 | 3 | 2 | 2 | 2 | 2 | 2 | 2 |
| 4 | 3 | 2 | 2 | 2 | 2 | 2 | 2 |
| 5 | 3 | 2 | 2 | 2 | 2 | 2 | 3 |
| 6 | 3 | 2 | 2 | 2 | 2 | 3 | 3 |
| 7~16 | 3 | 2 | 2 | 2 | 2 | 3 | 3 |

FIG. 18

| Fs2COUNT | 3(=2Ps) | 4(=3Ps) | 5(=4Ps) | 6(=5Ps) |
|---|---|---|---|---|
| n=1 | 0 | 0 | 0 | 0 |
| n=2 | $1/4(=\alpha)$ | $1/4(=\alpha)$ | $1/4(=\alpha)$ | $1/4(=\alpha)$ |
| n=3 | − | $-1/4(=\beta)$ | 0 | 0 |
| n=4 | − | − | $-1/4(=\beta)$ | 0 |
| n=5 | − | − | − | $-1/4(=\beta)$ |
| ⋮ | | | | |

FIG. 19

| Fs2COUNT | 3(=2Ps) | 4(=3Ps) | 5(=4Ps) | 6(=5Ps) |
|---|---|---|---|---|
| n=1 | 0 | 0 | 0 | 0 |
| n=2 | $-1/4(=\beta)$ | $-1/4(=\gamma)$ | $-1/4(=\gamma)$ | $-1/4(=\gamma)$ |
| n=3 | − | $1/4(=\theta)$ | 0 | 0 |
| n=4 | − | − | $1/4(=\theta)$ | 0 |
| n=5 | − | − | − | $1/4(=\theta)$ |
| ⋮ | | | | |

AUDIO SIGNAL PROCESSING APPARATUS AND RELATED COMPUTER PROGRAM

BACKGROUND OF THE INVENTION

1. Field of the Invention

This invention relates to an apparatus for processing an audio signal. In addition, the invention relates to a computer program for processing an audio signal.

2. Description of the Related Art

PCM audio data are generated by subjecting an analog audio signal to analog-to-digital conversion. The PCM audio data inevitably contain quantization errors. When the PCM audio data are converted back to an analog audio signal via digital-to-analog conversion, sounds represented by the resultant analog audio signal are different from those represented by the original analog audio signal due to the quantization errors.

It is known to compress the PCM audio data on an irreversible basis. When the compression-resultant audio data are expanded to PCM audio data and the PCM audio data are converted back to an analog audio signal via digital-to-analog conversion, sounds represented by the resultant analog audio signal are more different from those represented by the original analog audio signal.

Japanese patent application publication number P2002-169597A discloses an audio signal processing apparatus designed to improve the quality of sounds represented by an audio signal. The apparatus in Japanese application P2002-169597A includes a sampling-rate conversion circuit which receives first PCM audio data having a sequence of samples with a first sampling frequency. The sampling-rate conversion circuit implements up-sampling of the first PCM audio data. Specifically, the sampling-rate conversion circuit periodically samples the first PCM audio data at a second sampling frequency which is equal to twice the first sampling frequency. Thereby, the sampling-rate conversion circuit changes the first PCM audio data into second PCM audio data having a sequence of samples with the second sampling frequency. A digital low pass filter removes high-frequency noise (aliasing) components from the second PCM audio data to get third PCM audio data. A polarity detection circuit senses waveform extremes, that is, waveform polarity inversions, represented by the third PCM audio data. The polarity detection circuit calculates how many times the interval between the moments of the occurrence of two neighboring sensed waveform extremes is larger than a sampling period corresponding to the second sampling frequency. In other words, the polarity detection circuit calculates the number of samples which exist during every half-wave interval defined between waveform extremes. The polarity detection circuit outputs data representative of the result of the calculation to a correction table. The correction table stores a set of predetermined weighting signals assigned to different states of the calculation-result data fed from the polarity detection circuit. The correction table selects one from the weighting signals which corresponds to the state of the present calculation-result data. The correction table outputs the selected weighting signal to an output data generation circuit.

The apparatus in Japanese application P2002-169597A further includes a difference calculation circuit which computes the difference between the levels represented by two successive samples in the third PCM audio data outputted from the digital low pass filter. The difference calculation circuit generates data representative of the computed difference. The difference calculation circuit outputs the difference data to the output data generation circuit. The output data generation circuit receives the third PCM audio data from the digital low pass filter. The output data generation circuit produces a fourth PCM audio data in response to the third PCM audio data, the weighting signal, and the difference data. Specifically, the output data generation circuit multiplies the difference data by the weighting signal to generate corrective data. The output data generation circuit adds the corrective data to the third PCM audio data, and thereby corrects the third PCM audio data into the fourth PCM audio data. Basically, the fourth PCM audio data are improved over the first PCM audio data in sound quality.

SUMMARY OF THE INVENTION

It is a first object of this invention to provide an improved apparatus for processing an audio signal.

It is a second object of this invention to provide an improved computer program for processing an audio signal.

A first aspect of this invention provides an audio signal processing apparatus comprising a first table having coefficients; a second table having corrective values for correction of the coefficients in the first table, the corrective values being assigned to different sample numbers in at least two successive half-wave signal portions; first means for detecting a sample number in a corrected-object half-wave portion of a digital audio signal and a sample number in a half-wave portion of the digital audio signal which precedes the corrected-object half-wave portion; second means for correcting the coefficients in the first table into correction-resultant coefficients in response to the sample numbers detected by the first means while using the corrective values in the second table; and third means for correcting samples in the corrected-object half-wave portion of the digital audio signal in response to the correction-resultant coefficients generated by the second means.

A second aspect of this invention provides a computer program for audio signal processing in which a first table has coefficients, and a second table has corrective values for correction of the coefficients in the first table. The corrective values are assigned to different sample numbers in at least two successive half-wave signal portions. The computer program comprises the steps of a) detecting a sample number in a corrected-object half-wave portion of a digital audio signal and a sample number in a half-wave portion of the digital audio signal which precedes the corrected-object half-wave portion; b) correcting the coefficients in the first table into correction-resultant coefficients in response to the sample numbers detected by the step a) while using the corrective values in the second table; and c) correcting samples in the corrected-object half-wave portion of the digital audio signal in response to the correction-resultant coefficients generated by the step b).

A third aspect of this invention provides an audio signal processing apparatus comprising a first table having coefficients; a second table having corrective values for correction of the coefficients in the first table, the corrective values being assigned to different sample numbers in at least two successive half-wave signal portions; first means for detecting a sample number in a corrected-object half-wave portion of a digital audio signal and a sample number in a half-wave portion of the digital audio signal which precedes the corrected-object half-wave portion; second means for correcting the coefficients in the first table into correction-resultant coefficients in response to the sample numbers detected by the first means while using the corrective values in the second table; third means for detecting a difference between a level represented by a sample of interest in the corrected-object half-wave portion of the digital audio signal and a level represented by a sample which immediately precedes the sample of interest; fourth means for multiplying the difference detected by the third means and corresponding one of the correction-resultant coefficients generated by the second means to get a multiplication result; and fifth means for adding the multiplication result generated by the fourth means to the level represented by the sample of interest to correct the sample of interest.

A fourth aspect of this invention provides a computer program for audio signal processing in which a first table has coefficients, and a second table has corrective values for correction of the coefficients in the first table. The corrective values are assigned to different sample numbers in at least two successive half-wave signal portions. The computer program comprises the steps of a) detecting a sample number in a corrected-object half-wave portion of a digital audio signal and a sample number in a half-wave portion of the digital audio signal which precedes the corrected-object half-wave portion; b) correcting the coefficients in the first table into correction-resultant coefficients in response to the sample numbers detected by the step a) while using the corrective values in the second table; c) detecting a difference between a level represented by a sample of interest in the corrected-object half-wave portion of the digital audio signal and a level represented by a sample which immediately precedes the sample of interest; d) multiplying the difference detected by the step c) and corresponding one of the correction-resultant coefficients generated by the step b) to get a multiplication result; and e) adding the multiplication result generated by the fourth means to the level represented by the sample of interest to correct the sample of interest.

BRIEF DESCRIPTION OF THE DRAWIGNS

FIG. 5 is a diagram of a first gain table.

FIG. 6 is a diagram of a second gain table.

FIG. 7 is a diagram of a first example of one sub table in the coefficient correcting table.

FIG. 8 is a diagram of a second example of one sub table in the coefficient correcting table.

FIGS. 9, 10, 11, 12, 13, 14, and 15 are diagrams of first, second, third, fourth, fifth, sixth, and seventh areas in the gain bank table, respectively.

Figure 16:
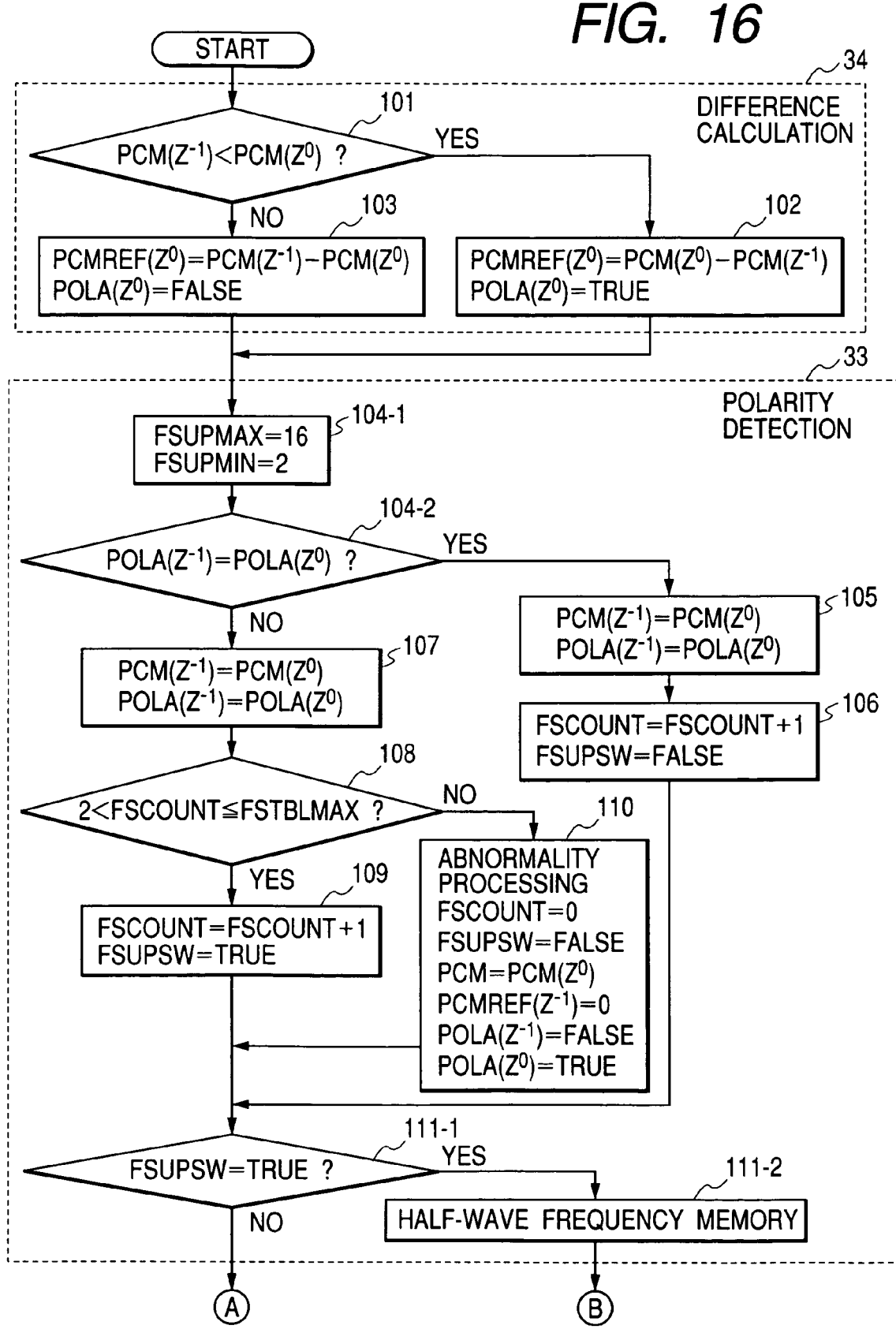
Figure 17:
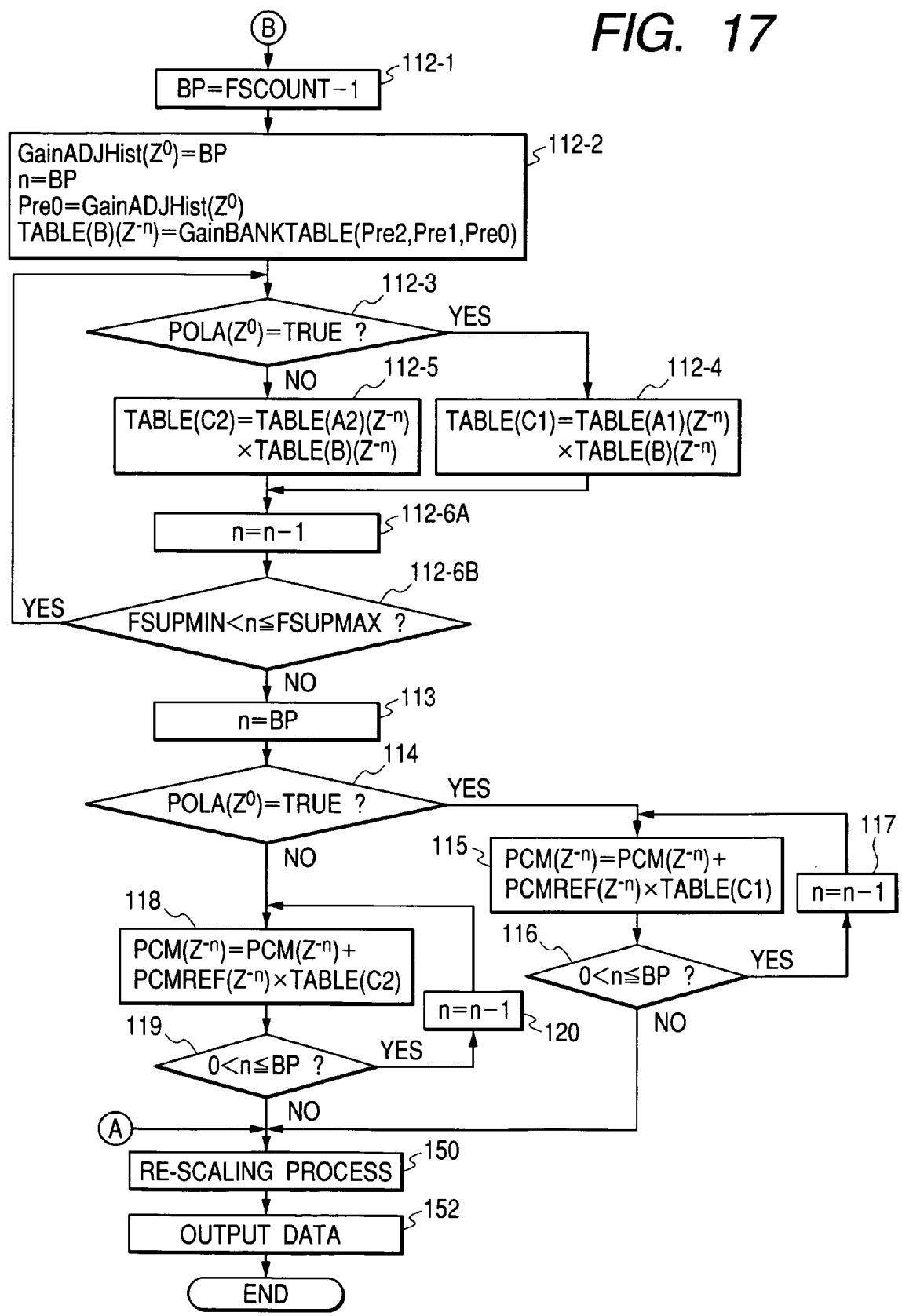

FIGS. 16 and 17 are a flowchart of a segment of a computer program for implementing audio signal processing to improve the sound quality represented by audio data.

FIG. 18 is a diagram showing an example of a part of a first coefficient table.

FIG. 19 is a diagram showing an example of a part of a second coefficient table.

Figure 20:
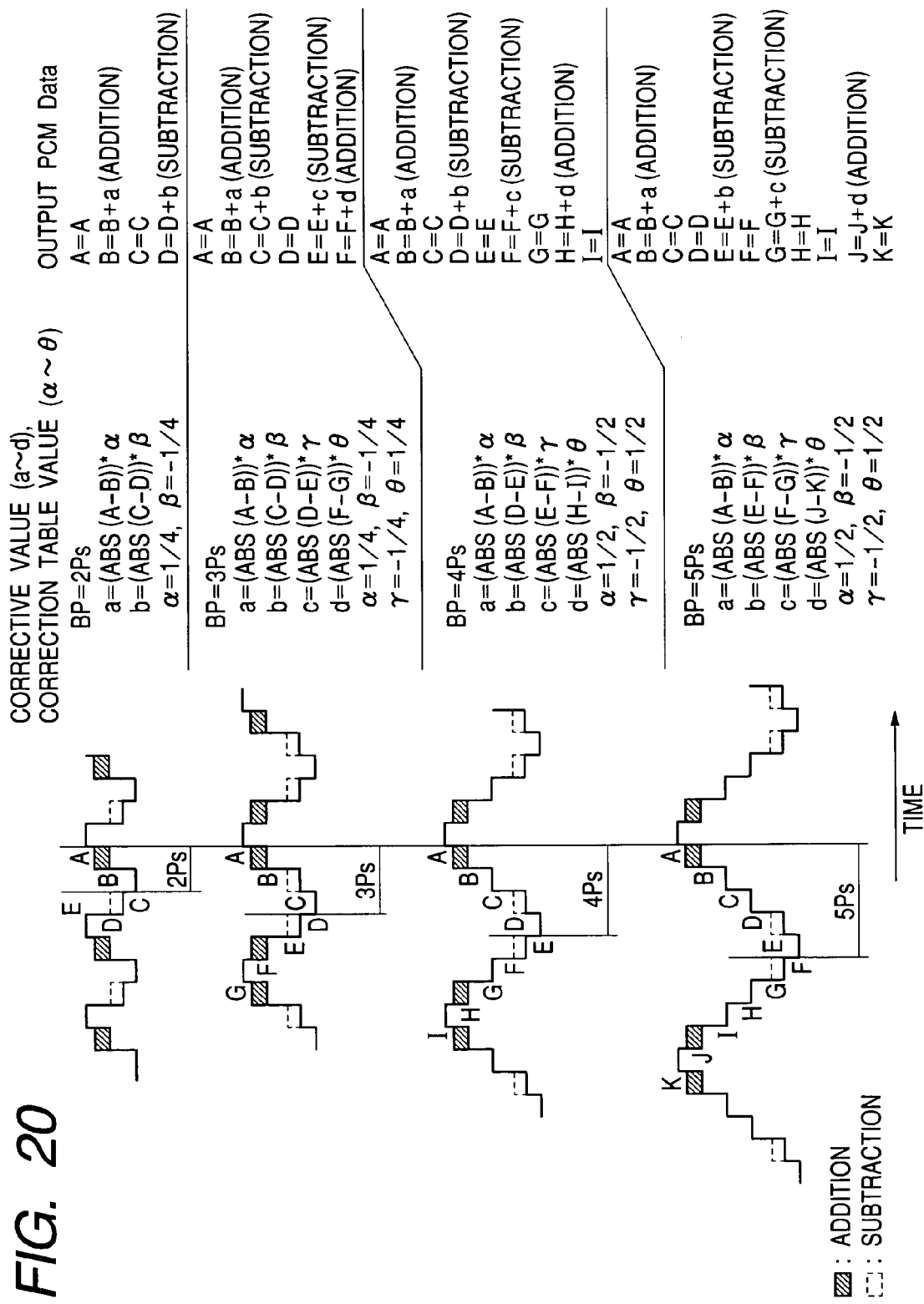

FIG. 20 is a diagram showing an example of different waveforms represented by before-correction audio data and after-correction audio data, and the relations among parameters relating to waveform correction.

DETAILED DESCRIPTION OF THE INVENTION

The apparatus in Japanese application P2002-169597A will be further explained below for a better understanding of this invention.

The correction table in the apparatus of Japanese application P2002-169597A includes sub correction tables "A" and "B" assigned to an upward-slope waveform portion and a downward-slope waveform portion respectively. Each of the sub correction tables "A" and "B" has predetermined weighting coefficients assigned to different numbers of samples in a half-wave interval and different sample positions in the half-wave interval. The weighting coefficients are separated into effective ones and ineffective ones (zero). The effective coefficients are positive coefficients and negative coefficients equal in absolute value. The sub correction table "A" is used for the third PCM audio data (the PCM audio data outputted from the digital low pass filter) representing an upward-slope half-wave portion between waveform extremes. The sub correction table "B" is used for the third PCM audio data representing a downward-slope half-wave portion between waveform extremes.

Specifically, for the third PCM audio data representing an upward-slope half-wave portion, samples composing the third PCM audio data are corrected as follows. The number of samples in the present half-wave interval is calculated. For every sample in the present half-wave interval, one is selected from the weighting coefficients in the sub correction table "A" in response to the calculated sample number and the position of the present sample relative to the present half-wave interval. The difference between the level represented by the present sample and the level represented by the immediately-preceding sample is multiplied by the selected weighting coefficient. The multiplication result is added to the level represented by the present sample to generate a correction-resultant sample. Thus, the present sample in the third PCM audio data is corrected into the sample of the fourth PCM audio data. Similarly, for the third PCM audio data representing a downward-slope half-wave portion, samples composing the third PCM audio data are corrected as follows. The number of samples in the present half-wave interval is calculated. For every sample in the present half-wave interval, one is selected from the weighting coefficients in the sub correction table "B" in response to the calculated sample number and the position of the present sample relative to the present half-wave interval. The difference between the level represented by the present sample and the level represented by the immediately-preceding sample is multiplied by the selected weighting coefficient. The multiplication result is added to the level represented by the present sample to generate a correction-resultant sample. Thus, the present sample in the third PCM audio data is corrected into the sample of the fourth PCM audio data.

In the apparatus of Japanese application P2002-169597A, the correction of every sample in the third PCM audio data depends only on (1) the number of samples in the related half-wave interval and (2) the difference between the level represented by the present sample and the level represented by the immediately-preceding sample. All the effective weighting coefficients used for the sample correction are equal in absolute value. These designs tend to cause the following problems.

Regarding the third PCM audio signal representing continuous wave of a relatively high intensity in which every half-wave interval has 2 or 3 samples (corresponding to a frequency of 7 kHz to 10 kHz), the correction is excessive. Such continuous wave is generated by a particular sound source, for example, a bell, a chime, a glockenspiel, or a musical synthesizer. The excessive correction causes a feeling of sound distortion in hearing sense.

Regarding the third PCM audio signal representing non-repetitive complicated wave in which every half-wave interval has 6 or less samples (corresponding to a frequency of 4 kHz or lower), the correction is insufficient. Such non-repetitive complicated wave is rich in harmonics, and corresponds to vocal or is generated by a musical instrument, for example, a piano. The insufficient correction causes a shortage of a feeling of resonance in hearing sense.

Regarding the third PCM audio signal representing non-repetitive complicated wave in which every half-wave interval has 3 or more samples (corresponding to a frequency of 7 kHz or higher), the correction is insufficient. Such non-repetitive complicated wave is generated by a particular sound source, for example, cymbals. The insufficient correction causes a shortage of a feeling of resolution, localization, or emphasis in hearing sense.

Embodiment

Figure 1:
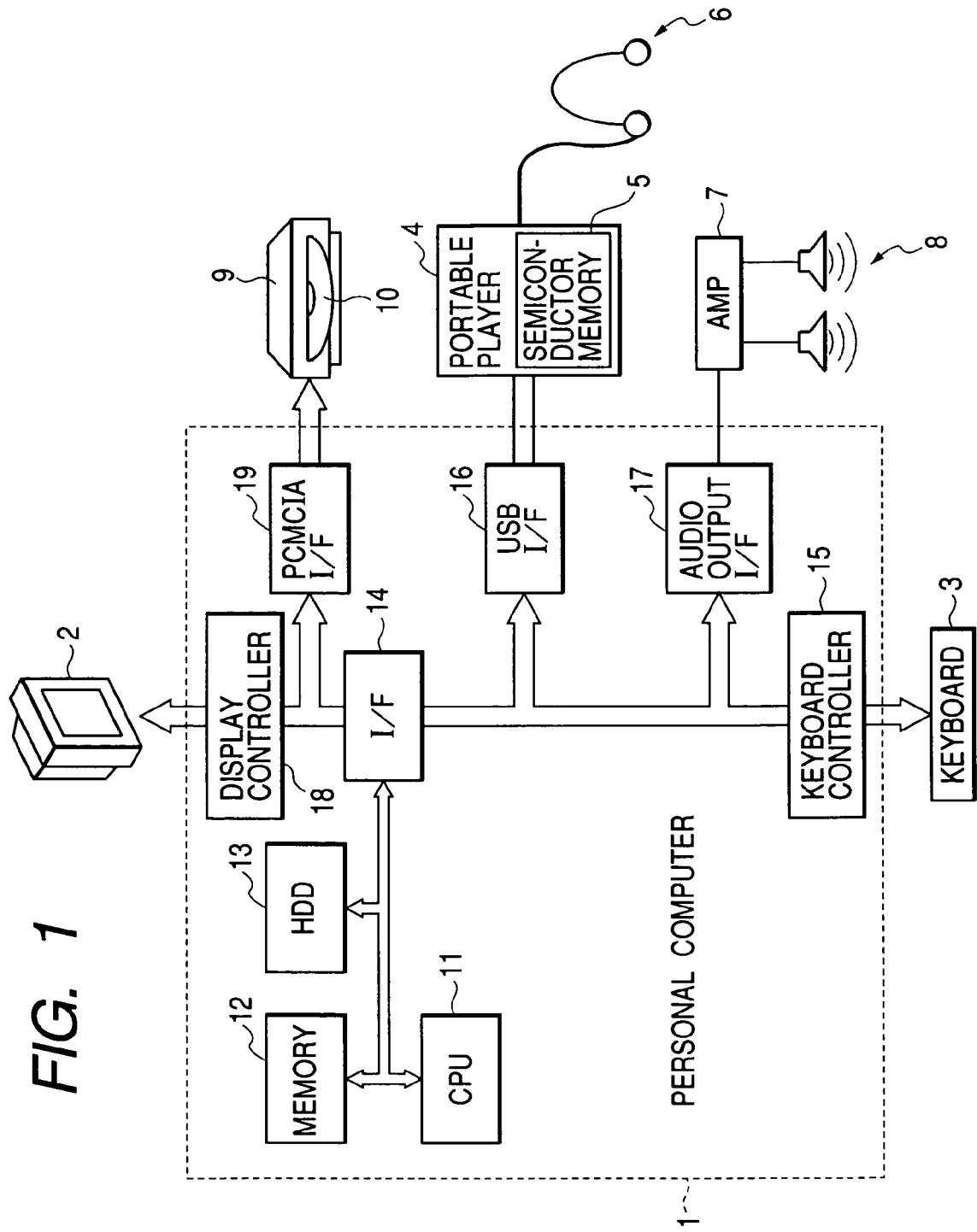
FIG. 1 is a diagram of an audio signal processing apparatus (an audio reproducing apparatus) according to an embodiment of this invention.

FIG. 1 shows an audio signal processing apparatus or an audio reproducing apparatus according to an embodiment of this invention. The apparatus of FIG. 1 includes a personal computer 1, a display 2, a keyboard 3, a portable player 4, an amplifier 7, and a CD-ROM drive 9. The devices 2, 3, 4, 7, and 9 are connected to the personal computer 1. The portable player 4 has a semiconductor memory 5. The portable player 4 is connected to headphones 6. The amplifier 7 is connected to loudspeakers 8. A CD-ROM 10 can be inserted into and ejected from the CD-ROM drive 9. The CD-ROM 10 is a recording medium.

The personal computer 1 includes a CPU 11, a memory 12, a hard disc drive unit 13, an interface 14, a keyboard controller 15, a USB (Universal Serial Bus) interface 16, an audio output interface 17, a display controller 18, and a PCMCIA (Personal Computer Memory Card International Association) interface 19. The CPU 11, the memory 12, the hard disc drive unit 13, and the interface 14 are connected via a bus. The CPU 11 operates in accordance with a control program stored in the memory 12 or the hard disc drive unit 13. The CPU 11 uses, for example, a 32-bit RISC processor. The memory 12 includes a ROM and a RAM. During operation, the CPU 11 uses the RAM in the memory 12 as a work memory. The hard disc drive unit 13 includes a hard disc (a recording medium). The interface 14 is connected via a bus to the keyboard controller 15, the USB interface 16, and the audio output interface 17. The USB interface 16 may be replaced by a conventional parallel interface or a conventional serial interface. The keyboard controller 15 is connected with the keyboard 3. The USB interface 16 and the audio output interface 17 are connected with the portable player 4 and the amplifier 7, respectively. The audio output interface 17 includes a digital-to-analog converter. The keyboard 3 may be replaced by another input device such as a touch panel device. When a touch panel device is used, the keyboard controller 15 is replaced by a touch panel device controller.

The interface 14 is connected via another bus to the display controller 18 and the PCMCIA interface 19. The display controller 18 is connected with the display 2. The PCMCIA interface 19 is connected with the CD-ROM drive 9.

The CD-ROM drive 9 connected with the PCMCIA interface 19 may be replaced by a CD-RW drive, a DVD-ROM drive, a DVD-RAM drive, a DVD-RW drive, or an MO drive. In this case, the CD-ROM 10 is replaced by a CD-RW, a DVD-ROM, a DVD-RAM, a DVD-RW, or an MO. The PCM-CIA interface 19 may be connected with a flash memory drive, a wireless interface card, or a modem card.

The CD-ROM 10 stores audio data of the PCM format or the MP3 format. The personal computer 1 can read out the audio data from the CD-ROM 10 via the CD-ROM drive 9. The read-out audio data can be transferred to the memory 12 or the hard disc drive unit 13 via the PCMCIA interface 19 and the interface 14 before being stored into the memory 12 or the hard disc drive unit 13 as a WAVE file or an MP3 file. The CPU 11 can correct the audio data in the memory 12 or the hard disc drive unit 13 to generate correction-resultant audio data. The CPU 11 stores a file of correction-resultant audio data back into the memory 12 or the hard disc drive unit 13. The file of correction-resultant audio data can be transferred from the memory 12 or the hard disc drive unit 13 to the audio output interface 17 via the interface 14. The audio output interface 17 converts the file of correction-resultant audio data into a corresponding analog audio signal. The audio output interface 17 feeds the analog audio signal to the amplifier 7. The amplifier 7 enlarges the analog audio signal to generate an amplification-resultant analog audio signal. The amplifier 7 feeds the amplification-resultant analog audio signal to the loudspeakers 8. The loudspeakers 8 convert the amplification-resultant analog audio signal into corresponding sounds.

It should be noted that audio data may be downloaded from the Internet or a suitable communication network into the memory 12 or the hard disc drive unit 13.

The semiconductor memory 5 is contained in the portable player 4. The semiconductor memory 5 may be detachably connected with the body of the portable player 4. An MP3 file of correction-resultant audio data can be transferred from the memory 12 or the hard disc drive unit 13 to the semiconductor memory 5 via the interface 14 and the USB interface 16. The main portion of the portable player 4 accesses the MP3 file in the semiconductor memory 5, and plays back the contents of the correction-resultant audio data. During the playback, the portable player 4 drives the headphones 6 to generate sounds corresponding to the contents of the correction-resultant audio data. The portable player 4 includes a CPU and a ROM storing a computer program for controlling the CPU to reproduce MP3 audio data. During the playback, the CPU in the portable player 4 operates in accordance with the computer program. The CPU uses, for example, a 32-bit RISC processor. The portable player 4 further includes a D/A converter for changing the correction-resultant audio data into a corresponding analog audio signal to be fed to the headphones 6.

The semiconductor memory 5 may store uncorrected audio data. In this case, the computer program for the CPU in the portable player 4 may be designed to correct the uncorrected audio data, to generate an analog audio signal based on the correction-resultant audio data, and to feed the analog audio signal to the headphones 6.

The semiconductor memory 5 may be insertable into and ejectable from the body of the portable player 4. The personal computer 1 may have a semiconductor memory drive connected to the interface 14. When the semiconductor memory 5 separate from the portable player 4 is connected with the semiconductor memory drive in the personal computer 1, correction-resultant audio data can be transferred from the memory 12 or the hard disc drive unit 13 to the semiconductor memory 5 via the interface 14 and the semiconductor memory drive. In the case where the semiconductor memory 5 loaded with the correction-resultant audio data is inserted into the body of the portable player 4, the contents of the correction-resultant audio data can be played back by the device 4. The portable player 4 may be replaced by a portable recorder/player.

Figure 2:
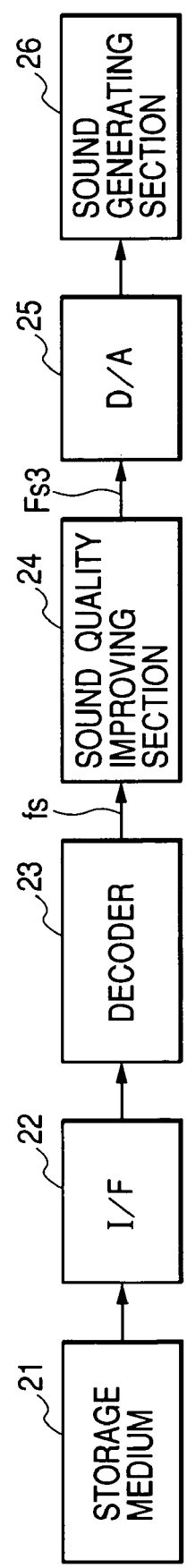
FIG. 2 is a functional diagram of the apparatus in FIG. 1.

As shown in FIG. 2, the audio signal processing apparatus or the audio reproducing apparatus includes a storage medium (a recording medium) 21, an interface 22, a decoder 23, a sound quality improving section 24, a D/A (digital-to-analog) converter 25, and a sound generating section 26 which are successively connected in that order along a signal flow direction.

The storage medium 21 holds audio data. The storage medium 21 is formed by the CD-ROM 10. The storage medium 21 may be formed by the memory 12, the hard disc drive unit 13, or the semiconductor memory 5. The interface 22 reads out the audio data from the storage medium 21. The interface 22 outputs the read-out audio data to the decoder 23. The interface 22 is formed by the personal computer 1 and the CD-ROM drive 9. The interface 22 may be formed by the portable player 4. In the case where the read-out audio data are of the PCM type (the linear PCM type), the decoder 23 passes the read-out audio data to the sound quality improving section 24 as they are. In the case where the read-out audio data are of a compressed type such as the MP3 type, the device 23 decodes the read-out audio data into PCM audio data (linear PCM audio data) and outputs the PCM audio data to the sound quality improving section 24. The decoder 23 is provided by the CPU 11 in the personal computer 1. The decoder 23 may be provided by the CPU in the portable player 4. The sound quality improving section 24 subjects the PCM audio data to a sound quality improving process to get quality-improved audio data. The sound quality improving section 24 feeds the quality-improved audio data to the D/A converter 25. The sound quality improving section 24 is provided by the CPU 11 or the personal computer 1. The sound quality improving section 24 may be provided by the CPU in the portable player 4. The D/A converter 25 changes the quality-improved audio data into a corresponding analog audio signal. The D/A converter 25 feeds the analog audio signal to the sound generating section 26. The D/A converter 25 is formed by the audio output interface 17. The D/A converter 25 may be one provided in the portable player 4. The sound generating section 26 converts the analog audio signal into corresponding sounds. The sound generating section 26 is formed by the amplifier 7 and the loudspeakers 8. The sound generating section 26 may be formed by the headphones 6.

The decoder 23 outputs linear PCM audio data to the sound quality improving section 24. The linear PCM audio data are in the form of a sequence of samples each having a predetermined number of bits. The linear PCM audio data relate to a predetermined sampling frequency fs. The linear PCM audio data are subjected to a scaling process to change the number of bits in every sample. The resultant audio data are denoted by Fs2. The audio data Fs2 are in the form of a sequence of samples. The scaling process may be omitted. In this case, the linear PCM audio data are directly used as the audio data Fs2.

Figure 3:
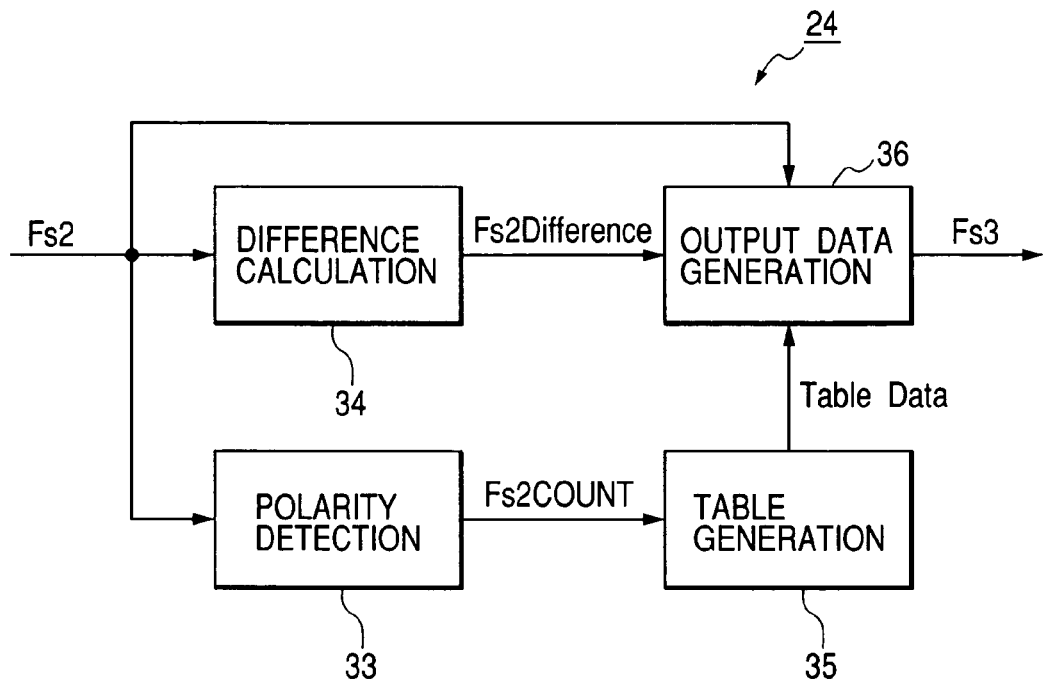
FIG. 3 is an operation flow diagram of a sound quality improving section in FIG. 2.

FIG. 3 is an operation flow diagram of the sound quality improving section 24. With reference to FIG. 3, a polarity detection block 33 monitors the waveform (the audio waveform or the analog waveform) represented by the audio data Fs2. The polarity detection block 33 senses extremes (peaks and valleys) in the waveform represented by the audio data Fs2. For every half-wave interval between the moments of the occurrence of two successive sensed extremes (a peak and a valley, or a valley and a peak), the polarity detection block 33 counts samples in the audio data Fs2. The count result indicates the number of samples in every half-wave interval. The polarity detection block 33 generates data Fs2COUNT representing the count result, that is, the number of samples in every half-wave interval.

A table generation block 35 responds to the sample number data Fs2COUNT. The table generation block 35 produces table data in response to the sample number Pre0 in the half-wave interval of interest, the sample number Pre1 in the half-wave interval immediately preceding the half-wave interval of interest, and the sample number Pre2 in the half-wave interval second immediately preceding the half-wave interval of interest. The sample numbers Pre0, Pre1, and Pre2 are represented by the sample number data Fs2COUNT. The produced table data indicate a weighting coefficient to be used in correcting the audio data Fs2. The produced table data correspond to a coefficient table (C1) or (C2).

Figure 4:
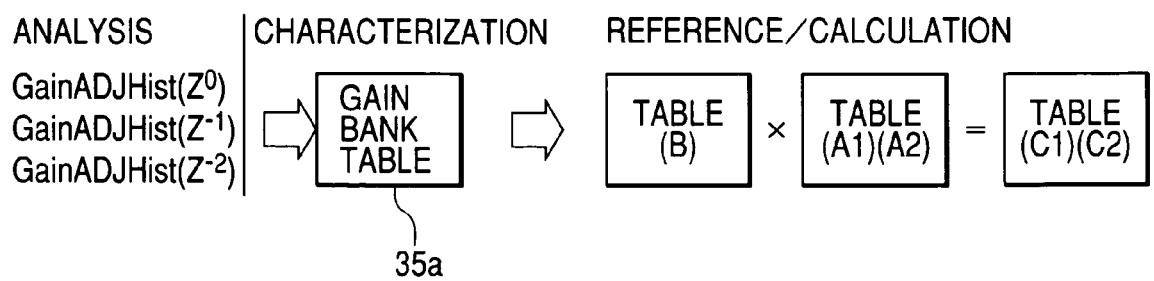
FIG. 4 is a diagram of the operating relation among a gain bank table, gain tables, a coefficient correcting table, and coefficient tables relating to a table generation block in FIG. 3.

With reference to FIG. 4, the table generation block 35 refers to a gain bank table 35a, gain tables (A1) and (A2), a coefficient correcting table (B), and the coefficient tables (C1) and (C2). The gain table (A1) is assigned to a half-wave interval corresponding to an upward-slope waveform portion represented by the audio data Fs2. In other words, the gain table (A1) is assigned to a half-wave interval from a waveform valley to a waveform peak. The gain table (A2) is assigned to a half-wave interval corresponding to a downward-slope waveform portion represented by the audio data Fs2. In other words, the gain table (A2) is assigned to a half-wave interval from a waveform peak to a waveform valley.

As shown in FIG. 5, the gain table (A1) has predetermined coefficients assigned to different samples numbers 3(=2Ps), 4(=3Ps), . . . , and 16(=15Ps) and different sample positions "n" (n=1, 2, 3, . . . , and 15) in a half-wave interval. Here, Ps denotes the 1-sample period of the audio data Fs2. As shown in FIG. 6, the gain table (A2) has predetermined coefficients assigned to different samples numbers 3(=2Ps), 4(=3Ps), . . . , and 16(=15Ps) and different sample positions "n" (n=1, 2, 3, . . . , and 15) in a half-wave interval.

The coefficient correcting table (B) has a plurality of sub tables including a first sub table designed to remove a problem about a feeling of sound distortion, a second sub table designed to remove a problem about a feeling of resonance, and a third sub table designed to remove a problem about a feeling of resolution and localization. Each of the sub tables has corrective values assigned to different bank numbers of 0, 1, 2, and 3 and different sample positions "n" (n=1, 2, 3, . . . , and 15) in a half-wave interval. The bank numbers may only be 1, 2, and 3. The corrective values are designed for correction of the coefficients in the gain tables (A1) and (A2).

Specifically, the third sub table in the coefficient correcting table (B) is designed to emphasize a feeling of resolution. The third sub table has contents as shown in FIG. 7. The second sub table in the coefficient correcting table (B) is designed to emphasize a feeling of resonance. The second sub table has contents as shown in FIG. 8.

The sub tables in the coefficient correcting table (B) have different ID numbers, respectively. One can be selected from the sub tables by designating a desired ID number in response to user's choice.

The gain bank table 35a is divided into first, second, third, fourth, fifth, sixth, and seventh areas, one of which is selected in accordance with the sample number Pre2. The first table area is used when the sample number Pre2 is 0 or 1. As shown in FIG. 9, the first table area lists numerals 1, 2, and 3 assigned to different sample numbers Pre0 and Pre1. The numerals 1, 2, and 3 correspond to the bank numbers used for designating ones among the corrective values in the selected sub table in the coefficient correcting table (B). The second table area is used when the sample number Pre2 is 2. As shown in FIG. 10, the second table area lists numerals 1, 2, and 3 assigned to different sample numbers Pre0 and Pre1. The third table area is used when the sample number Pre2 is 3. As shown in FIG. 11, the third table area lists numerals 1, 2, and 3 assigned to different sample numbers Pre0 and Pre 1. The fourth table area is used when the sample number Pre2 is 4. As shown in FIG. 12, the fourth table area lists numerals 1, 2, and 3 assigned to different sample numbers Pre0 and Pre1. The fifth table area is used when the sample number Pre2 is 5. As shown in FIG. 13, the fifth table area lists numerals 1, 2, and 3 assigned to different sample numbers Pre0 and Pre1. The sixth table area is used when the sample number Pre2 is 6. As shown in FIG. 14, the sixth table area lists numerals 1, 2, and 3 assigned to different sample numbers Pre0 and Pre1. The seventh table area is used when the sample number Pre2 is in the range of 7 to 16. As shown in FIG. 15, the seventh table area lists numerals 1, 2, and 3 assigned to different sample numbers Pre0 and Pre1.

For every half-wave interval, one of the numerals (the bank numbers) 1, 2, and 3 in the first to seventh areas of the gain bank table 35a is selected in accordance with the sample numbers Pre0, Pre1, and Pre2. On the other hand, one is selected from the sub tables in the coefficient correcting table (B) in response to user's choice. For every sample in the present half-wave interval, a corrective value is read out from the selected sub table in response to the position "n" of the present sample relative to the present half-wave interval, and in response to the selected bank number. In the case where the present half-wave interval corresponds to an upward-slope waveform portion, for every sample, a coefficient is read out from the gain table (A1) in accordance with the number of samples in the present half-wave interval and the position "n" of the present sample relative to the present half-wave interval. The read-out coefficient and the read-out corrective value are multiplied. The multiplication result is set in a corresponding place in the coefficient table (C1) as a weighting coefficient. In the case where the present half-wave interval corresponds to a downward-slope waveform portion, for every sample, a coefficient is read out from the gain table (A2) in accordance with the number of samples in the present half-wave interval and the position "n" of the present sample relative to the present half-wave interval. The read-out coefficient and the read-out corrective value are multiplied. The multiplication result is set in a corresponding place in the coefficient table (C2) as a weighting coefficient. Table data representative of the multiplication results in the coefficient tables (C1) and (C2) are used by an output data generation block 36. Each of the coefficient tables (C1) and (C2) has the multiplication results (the weighting coefficients) assigned to different sample numbers and different sample positions "n" in a half-wave interval.

The gain bank table 35a may be modified as follows. In the modified table 35a, bank numbers (numerals 0, 1, 2, and 3 or numerals 1, 2, and 3) are assigned also to different values of the difference between the levels at two neighboring waveform extremes or the differences among the levels at three or more neighboring waveform extremes represented by the audio data Fs2. In this case, such a difference or differences are detected. By referring to the modified table 35a, one of the bank numbers is selected in response to not only the sample numbers Pre0, Pre1, and Pre2 but also the detected difference or differences.

With reference to FIG. 3, a difference calculation block 34 computes the difference between the level (the waveform level or the analog value) represented by the present sample in the audio data Fs2 and the level represented by the immediately preceding sample therein. The difference calculation block 34 generates data Fs2Difference representing the computed difference.

The output data generation block 36 produces correction-resultant PCM audio data Fs3 in response to the audio data Fs2, the difference data Fs2Difference, and the table data (the weighting coefficient) on a sample-by-sample basis. Specifically, the output data generation block 36 multiplies the values represented by the difference data Fs2Difference and the table data (the weighting coefficient). Thus, a weighting process is implemented. The output data generation block 36 adds the multiplication result to the level represented by the audio data Fs2. The output data generation block 36 uses the addition result as a corresponding sample of the correction-resultant audio data Fs3. Accordingly, the correction-resultant audio data Fs3, the audio data Fs2, the difference data Fs2Difference, and the table data are in the following relation.

$$Fs3=Fs2+(Fs2\text{Difference}\times\text{Table Data}) \quad (1)$$

The correction-resultant audio data Fs3 are quality-improved audio data fed to the D/A converter 25 (see FIG. 2). The correction-resultant audio data Fs3 may be subjected to a re-scaling process before being fed to the D/A converter 25.

The personal computer 1 (the CPU 11) operates in accordance with a control program (a computer program) stored in the memory 12 or the hard disc drive unit 13. The control program may be stored in the semiconductor memory 5.

FIGS. 16 and 17 are a flowchart of a segment of the control program for the personal computer 1 which corresponds to the sound quality improving section 24 in FIG. 2. The program segment in FIGS. 16 and 17 is executed for every sample in the audio data Fs2. The computer program for controlling the CPU within the portable player 4 may have a segment similar to that in FIGS. 16 and 17. In this case, the portable player 4 operates to correct audio data in the semiconductor memory 5 and change the correction-resultant audio data into corresponding sounds.

With reference to FIGS. 16 and 17, a first step 101 of the program segment detects the level $PCM(Z^0)$ represented by the present sample in the audio data Fs2. The step 101 retrieves, from a work memory, a signal representative of the level $PCM(Z^{-1})$ represented by the immediately-preceding sample in the audio data Fs2. The work memory is formed by, for example, the memory 12 in the personal computer 1. The step 101 compares the present sample level $PCM(Z^0)$ with the immediately-preceding sample level $PCM(Z^{-1})$. When the present sample level $PCM(Z^0)$ is greater than the immediately-preceding sample level $PCM(Z^{-1})$, the program advances from the step 101 to a step 102. Otherwise, the program advances from the step 101 to a step 103. The relation "$PCM(Z^0)>PCM(Z^{-1})$" indicates that the waveform level is increasing. The relation "$PCM(Z^0)\leq PCM(Z^{-1})$" indicates that the waveform level is decreasing or constant.

The step 102 subtracts the immediately-preceding sample level $PCM(Z^{-1})$ from the present sample level $PCM(Z^0)$ to get a difference value $PCMREF(Z^0)$. The difference value $PCMREF(Z^0)$ corresponds to the difference data Fs2Difference. The step 102 sets a polarity indicator POLA $(Z^0)$ into a state TRUE representing that the waveform level is increasing. After the step 102, the program advances to a step 104-1.

The step 103 subtracts the present sample level $PCM(Z^0)$ from the immediately-preceding sample level $PCM(Z^{-1})$ to get a difference value $PCMREF(Z^0)$. The difference value $PCMREF(Z^0)$ corresponds to the difference data Fs2Difference. The step 103 sets the polarity indicator POLA ($Z^0$) into a state FALSE representing that the waveform level is decreasing or constant. After the step 103, the program advances to the step 104-1.

The steps 101, 102, and 103 compose the difference calculation block 34 in FIG. 3.

The step 104-1 sets a maximum number FSUPMAX to 16 regarding a sample number in a half-wave interval. The step 104-1 sets a minimum number FSUPMIN to 2 regarding a sample number in a half-wave interval.

A step 104-2 following the step 104-1 retrieves, from the work memory, a signal representative of the polarity indicator POLA($Z^{-1}$) related to the immediately-preceding sample. The step 104-2 compares the polarity indicator POLA($Z^0$) related to the present sample with the polarity indicator POLA($Z^{-1}$) related to the immediately-preceding sample. When the polarity indicators POLA($Z^0$) and POLA($Z^{-1}$) are the same in state, the program advances from the step 104-2 to a step 105. Otherwise, the program advances from the step 104-2 to a step 107.

The step 105 stores a signal representative of the present sample level PCM($Z^0$) into the work memory for later use as an immediately-preceding sample level PCM($Z^{-1}$). In other words, the step 105 equalizes the immediately-preceding sample level PCM($Z^{-1}$) to the present sample level PCM($Z^0$). The step 105 stores a signal representative of the present sample polarity indicator POLA($Z^0$) into the work memory for later use as an immediately-preceding sample polarity indicator POLA($Z^{-1}$). In other words, the step 105 equalizes the immediately-preceding sample polar indicator POLA($Z^{-1}$) to the present sample polar indicator POLA($Z^0$).

A step 106 subsequent to the step 105 increments a count number FSCOUNT by 1. The count number FSCOUNT indicates the number of samples in the present half-wave interval between two neighboring waveform extremes. The count number FSCOUNT corresponds to the sample number data Fs2COUNT. The step 106 sets a switch flag FSUPSW into an off state FALSE. The switch flag FSUPSW decides that the output data generation block 36 (see FIG. 3) should be on or off. After the step 106, the program advances to a step 111-1.

The step 107 stores a signal representative of the present sample level PCM($Z^0$) into the work memory for later use as an immediately-preceding sample level PCM($Z^{-1}$). In other words, the step 105 equalizes the immediately-preceding sample level PCM($Z^{-1}$) to the present sample level PCM($Z^0$). The step 107 stores a signal representative of the present sample polarity indicator POLA($Z^0$) into the work memory for later use as an immediately-preceding sample polarity indicator POLA($Z^{-1}$). In other words, the step 107 equalizes the immediately-preceding sample polar indicator POLA($Z^{-1}$) to the present sample polar indicator POLA($Z^0$).

A step 108 following the step 107 decides whether or not the count number FSCOUNT is in a range of 2 to a predetermined maximum value FSTBLMAX corresponding to an upper limit for real-time data processing. Specifically, the step 108 compares the count number FSCOUNT with 2 and the maximum number FSTBLMAX. When the count number FSCOUNT is greater than 2 and is equal to or less than the maximum number FSTBLMAX, the program advances from the step 108 to a step 109. Otherwise, the program advances from the step 108 to a step 110.

The step 109 increments the count number FSCOUNT by 1. The step 106 sets the switch flag FSUPSW into an on state TRUE. After the step 109, the program advances to the step 111-1.

The step 110 implements abnormality processing. Specifically, the step 110 sets the count number FSCOUNT to 0. The step 110 sets the switch flag FSUPSW into the off state FALSE. The step 110 sets a value PCM to the present sample level PCM($Z^0$). The step 110 sets an immediately-preceding sample difference value PCMREF($Z^{-1}$) to 0. The step 110 sets the immediately-preceding sample polar indicator POLA ($Z^{-1}$) into the state FALSE. The step 110 sets the present sample polar indicator POLA($Z^0$) into the state TRUE. After the step 110, the program advances to the step 111-1.

The step 111-1 decides whether or not the switch flag FSUPSW is in the state TRUE. When the switch flag FSUPSW is in the state TRUE, the program advances from the step 111-1 to a step 111-2 corresponding to a half-wave frequency memory. Otherwise, the program advances from the step 111-1 to a block 150 for a re-scaling process.

The step 111-2 sets a value GainADJHist($Z^{-2}$) to a value GainADJHist($Z_{-1}$). The step 111-2 sets the value GainADJHist($Z^{-1}$) to a value GainADJHist($Z^0$). The step 111-2 sets a sample number Pre2 to the value GainADJHist($Z^{-2}$). The step 111-2 sets a sample number Pre1 to the value GainADJHist ($Z^{-1}$). After the step 111-2, the program advances to a step 112-1.

The steps 104-1, 104-2, 105, 106, 107, 108, 109, 110, 111-1 and 111-2 compose the polarity detection block 33 in FIG. 3.

The step 112-1 sets a value BP equal to the count number FSCOUNT minus 1. The value BP indicates the length of the present half-wave interval between the two neighboring waveform extremes as expressed by a sample number.

A step 112-2 following the step 112-1 sets the value GainADJHist($Z^0$) to the value BP. The step 112-2 sets a sample position indicator (a sample position number) "n" to the value BP. The sample position indicator "n" represents the position of a sample of interest relative to the present half-wave interval. The step 112-2 sets a sample number Pr0 to the value GainADJHist($Z^0$). The step 112-2 sets a coefficient correcting table (B) ($Z^{-n}$) on the basis of a gain bank table (Pre2, Pre 1, Pre0). Specifically, the step 112-2 sets the coefficient correcting table (B) in response to the sample numbers Pre2, Pre1, and Pre0 by referring to the gain bank table 35a (see FIGS. 4 and 9-15). The setting of the coefficient correcting table (B) means the selection of ones from the corrective values in the coefficient correcting table (B) in response to the sample numbers Pre2, Pre1, and Pre0 by referring to the gain bank table 35a. The set coefficient correcting table (B) which corresponds to the selected corrective values is denoted by (B)($Z^{-n}$). After the step 112-2, the program advances to a step 112-3.

The step 112-3 decides whether or not the present sample polar indicator POLA($Z^0$) is in the state TRUE. When the present sample polar indicator POLA($Z^0$) is in the state TRUE, the program advances from the step 112-3 to a step 112-4. Otherwise, the program advances from the step 112-3 to a step 112-5.

The step 112-4 multiplies a gain table (A1)($Z^{-n}$) and the coefficient correcting table (B)($Z^{-n}$). The step S112-4 sets the multiplication result as a coefficient table (C1). Specifically, the step 112-4 multiplies a coefficient in the gain table (A1) and a corrective value in the coefficient correcting table (B) for a sample at a position designated by the sample position indicator "n". The step 112-4 sets the multiplication result as a weighting coefficient in the coefficient table (C1) for the sample at the position designated by the sample position indicator "n". Preferably, the setting of the weighting coefficient is executed for each of the different sample numbers in one half-wave interval. After the step 112-4, the program advances to a step 112-6A.

The step 112-5 multiplies a gain table (A2)($Z^{-n}$) and the coefficient correcting table (B)($Z^{-n}$). The step S112-5 sets the multiplication result as a coefficient table (C2). Specifically, the step 112-5 multiplies a coefficient in the gain table (A2) and the corrective value in the coefficient correcting table (B) for the sample at the position designated by the sample position indicator "n". The step 112-5 sets the multiplication result as a weighting coefficient in the coefficient table (C2) for the sample at the position designated by the sample position indicator "n". Preferably, the setting of the weighting coefficient is executed for each of the different sample numbers in one half-wave interval. After the step 112-5, the program advances to the step 112-6A.

The step 112-6A decrements the sample position number (the sample position indicator) "n" by 1.

A step 112-6B following the step 112-6A decides whether or not the sample position indicator "n" is in the range between the minimum number FSUPMIN and the maximum number FSUPMAX. In other words, the step 112-6 decides whether or not the relation "FSUPMIN<n≦FSUPMAX" is satisfied. When the sample position indicator "n" is in the range between the minimum number FSUPMIN and the maximum number FSUPMAX, the program returns from the step 112-6B to the step 112-3. Otherwise, the program advances from the step 112-6B to a step 113.

The steps 112-2, 112-3, 112-4, 112-5, 112-6A, and 112-6B compose the table generation block 35 in FIG. 3.

The step 113 sets the sample position indicator (the sample position number) "n" to the value BP.

A step 114 following the step 113 decides whether or not the present sample polar indicator POLA($Z^0$) is in the state TRUE. When the present sample polar indicator POLA($Z^0$) is in the state TRUE, the program advances from the step 114 to a step 115. Otherwise, the program advances from the step 114 to a step 118.

The step 115 reads out a weighting coefficient from the coefficient table (C1) in response to the sample number FSCOUNT and the sample position number "n" in the present half-wave interval. The step 115 retrieves the difference value PCMREF($Z^{-n}$) corresponding to the present sample, that is, the sample at a position designated by the sample position number "n". The step 115 multiplies the difference value PCMREF($Z^{-n}$) by the read-out coefficient. The step 115 adds the multiplication result to the level PCM($Z^{-n}$) represented by the present sample (the sample at the position designated by the sample position number "n"). Thus, the step 115 corrects the original sample into a sample in correction-resultant audio data which represents the level equal to the original level plus the multiplication result. The correction-resultant sample is at the position designated by the sample position number "n".

A step 116 subsequent to the step 115 decides whether or not the sample position number "n" is in the range between 0 and the value BP. Specifically, the step 116 compares the sample position number "n" with 0 and the value BP. When the sample position number "n" is greater than 0 and equal to or smaller than the value BP, the program advances from the step 116 to a step 117. Otherwise, the program advances from the step 116 to the re-scaling process block 150.

The step 117 decrements the sample position number "n" by 1. After the step 117, the program returns to the step 115.

The step 118 reads out a weighting coefficient from the coefficient table (C2) in response to the sample number FSCOUNT and the sample position number "n" in the present half-wave interval. The step 118 retrieves the difference value PCMREF($Z^{-n}$) corresponding to the present sample, that is, the sample at the position designated by the sample position number "n". The step 118 multiplies the difference value PCMREF($Z^{-n}$) by the read-out coefficient. The step 118 adds the multiplication result to the level PCM($Z^{-n}$) represented by the present sample (the sample at the position designated by the sample position number "n"). Thus, the step 118 corrects the original sample into a sample in correction-resultant audio data which represents the level equal to the original level plus the multiplication result. The correction-resultant sample is at the position designated by the sample position number "n".

A step 119 subsequent to the step 118 decides whether or not the sample position number "n" is in the range between 0 and the value BP. Specifically, the step 119 compares the sample position number "n" with 0 and the value BP. When the sample position number "n" is greater than 0 and equal to or smaller than the value BP, the program advances from the step 119 to a step 120. Otherwise, the program advances from the step 119 to the re-scaling process block 150.

The step 120 decrements the sample position number "n" by 1. After the step 120, the program returns to the step 118.

The steps 112-1, 113, 114, 115, 116, 117, 118, 119, and 120 compose the output data generation block 36 in FIG. 3.

In FIG. 17, the re-scaling process block 150 subjects the correction-resultant audio data to a re-scaling process on a sample-by-sample basis. The re-scaling process block 150 is followed by a block 152 for outputting the re-scaling-resultant audio data Fs3 to the D/A converter 25 (see FIG. 2) on a sample-by-sample basis. After the data outputting block 152, the current execution cycle of the program segment ends.

FIG. 18 shows an example of a part of the contents of the completed coefficient table (C1). As shown in FIG. 18, the coefficient table (C1) has weighting coefficients assigned to different sample numbers Fs2COUNT (2Ps, 3Ps, 4Ps, ... ) and different sample positions "n" (n=1, 2, 3, ... ).

FIG. 19 shows an example of a part of the contents of the completed coefficient table (C2). As shown in FIG. 19, the coefficient table (C2) has weighting coefficients assigned to different sample numbers Fs2COUNT (2Ps, 3Ps, 4Ps, ... ) and different sample positions "n" (n=1, 2, 3, ... ).

FIG. 20 shows an example of the four waveforms represented by the audio data Fs2 in which the length BP of one half-wave interval between two neighboring waveform extremes is equal to 3, 4, 5, and 6 (2Ps, 3Ps, 4Ps, and 5Ps).

With reference to FIG. 20, regarding the waveform corresponding to a value BP of 3 (2Ps), the sample level increases from a valley to a peak as C→B→A. The count number FSCOUNT corresponding to the sample number data Fs2COUNT is equal to 3 for the present half-wave interval between the valley "C" to the peak "A". The three successive samples "C", "B", and "A" compose the present half-wave interval. The sample "B" corresponds to a sample position "n" of 2. The sample "C" corresponds to a sample position "n" of 1. The value BP and the count number FSCOUNT are in the relation as "BP=FSCOUNT-1=2". Since the present half-wave interval corresponds to an upward-slope waveform portion, the coefficient table (C1) is used. As shown in FIG. 18, a weighting coefficient of ¼ (=α) is assigned to a sample position "n" of 2 (the sample "B") and a count number FSCOUNT (Fs2COUNT) of 3 in the coefficient table (C1). Thus, for the sample "B", a weighting coefficient of ¼ is read out from the coefficient table (C1). For the sample "B", the sample level B is subtracted from the sample level A. The absolute value of the subtraction result "A−B" is multiplied by the read-out coefficient "¼". The multiplication result "ABS(A−B)×¼" is added to the sample level B. Therefore, the sample "B" is corrected into a sample representing the level "B+ABS(A−B)×¼". As shown in FIG. 18, a weighting coefficient of 0 is assigned to a sample position "n" of 1 (the sample "C") and a count number FSCOUNT (Fs2COUNT)

of 3 in the coefficient table (C1). Thus, for the sample "C", a weighting coefficient of 0 is read out from the coefficient table (C1). For the sample "C", the sample level C is subtracted from the sample level B. The absolute value of the subtraction result "B−C" is multiplied by the read-out coefficient "0". The multiplication result "0" is added to the sample level C. Therefore, the sample "C" is uncorrected.

Regarding the waveform corresponding to a value BP of 3 (2Ps), the sample level decreases from a peak to a valley as E→D→C. The count number FSCOUNT corresponding to the sample number data Fs2COUNT is equal to 3 for the present half-wave interval between the peak "E" to the valley "C". The three successive samples "E", "D", and "C" compose the present half-wave interval. The sample "D" corresponds to a sample position "n" of 2. The sample "E" corresponds to a sample position "n" of 1. The value BP and the count number FSCOUNT are in the relation as "BP=FSCOUNT-1=2". Since the present half-wave interval corresponds to a downward-slope waveform portion, the coefficient table (C2) is used. As shown in FIG. 19, a weighting coefficient of $-\frac{1}{4}$ (=β) is assigned to a sample position "n" of 2 (the sample "D") and a count number FSCOUNT (Fs2COUNT) of 3 in the coefficient table (C2). Thus, for the sample "D", a weighting coefficient of $-\frac{1}{4}$ is read out from the coefficient table (C2). For the sample "D", the sample level D is subtracted from the sample level C. The absolute value of the subtraction result "C−D" is multiplied by the read-out coefficient "$-\frac{1}{4}$". The multiplication result "−ABS(C−D)×$\frac{1}{4}$" is added to the sample level B. Therefore, the sample "D" is corrected into a sample representing the level "B-ABS(C−D)×$\frac{1}{4}$". As shown in FIG. 19, a weighting coefficient of 0 is assigned to a sample position "n" of 1 (the sample "E") and a count number FSCOUNT (Fs2COUNT) of 3 in the coefficient table (C2). Thus, for the sample "E", a weighting coefficient of 0 is read out from the coefficient table (C2). For the sample "E", the sample level E is subtracted from the sample level D. The absolute value of the subtraction result "D−E" is multiplied by the read-out coefficient "0". The multiplication result "0" is added to the sample level E. Therefore, the sample "E" is uncorrected.

The above-indicated corrections to the samples "B" and "D" improve the audio-data sound quality.

The CPU 11 in the personal computer 1 or the CPU in the portable player 4 uses, for example, a 32-bit RISC processor. The CPU 11 in the personal computer 1 or the CPU in the portable player 4 implements the previously-mentioned waveform correction on a real-time basis. The CPU 11 in the personal computer 1 or the CPU in the portable player 4 may use a higher-speed processor. In this case, it is possible to consider greater count numbers FSCOUNT, and to load the coefficient correcting table (B) with corrective values with decimals of a larger number of digits. Therefore, the audio-data sound quality can be further improved. In the case of FSCOUNT=7 (6Ps), the number of samples to be corrected increases by 1 in each of an upward-slope half-wave interval and a downward-slope half-wave interval so that the number of corrective values increases accordingly.

As previously mentioned, each of the gain tables (A1) and (A2) has predetermined coefficients assigned to different samples numbers 3(=2Ps), 4(=3Ps), . . . , and 16(=15Ps) and different sample positions "n" (n=1, 2, 3, . . . , and 15) in a half-wave interval. The coefficient correcting table (B) has a plurality of sub tables including a first sub table designed to remove a problem about a feeling of sound distortion, a second sub table designed to remove a problem about a feeling of resonance, and a third sub table designed to remove a problem about a feeling of resolution and localization. Each of the sub tables has corrective values assigned to different bank numbers 0, 1, 2, and 3 and different sample positions "n" (n=1, 2, 3, . . . , and 15) in a half-wave interval. The corrective values are designed for correction of the coefficients in the gain tables (A1) and (A2). Regarding an audio signal representing continuous wave of a relatively high intensity from the viewpoint of "half-wave", it is possible to optimize the weighting process and to prevent the occurrence of a feeling of sound distortion in hearing sense. Regarding an audio signal representing non-repetitive complicated wave from the viewpoint of "half-wave" which contains a lot of harmonics, it is possible to optimize the weighting process and to emphasize a feeling of resonance and a feeling of resolution and localization in hearing sense.

The difference calculation block 34 computes the difference between the level represented by the present sample and the level represented by the immediately-preceding sample. The gain tables (A1) and (A2) are changed into the coefficient table (C) according to the coefficient correcting table (B). The above-indicated computed difference and a corresponding coefficient in the coefficient table (C) are multiplied, and the multiplication result is used in the correction of audio data. As previously mentioned, the coefficient correcting table (B) has a plurality of sub tables including a first sub table designed to remove a problem about a feeling of sound distortion, a second sub table designed to remove a problem about a feeling of resonance, and a third sub table designed to remove a problem about a feeling of resolution and localization. Regarding an audio signal representing continuous wave of a relatively high intensity from the viewpoint of "half-wave", it is possible to optimize the weighting process and to prevent the occurrence of a feeling of sound distortion in hearing sense. Regarding an audio signal representing non-repetitive complicated wave from the viewpoint of "half-wave" which contains a lot of harmonics, it is possible to optimize the weighting process and to emphasize a feeling of resonance and a feeling of resolution and localization in hearing sense.

The previously-mentioned waveform correction can enhance the quality of sounds represented by PCM audio data relating to lower sampling rates. Thus, the waveform correction is useful for the storing of audio data into a semiconductor memory having a significantly limited capacity, and the delivery of music data through a network strictly limited in data transfer rate.

The sound quality improving section 24 may be implemented in a mobile telephone set, a PHS telephone set, an Internet-based telephone set, and a semiconductor-memory-based voice recorder. The sound quality improving section 24 can increase the articulation about reproduced sounds and voices.

The previously-mentioned audio signal processing for improving the sound quality can be applied to non-compressed PCM (linear PCM) data. The audio signal processing can be applied to data of various formats. Compressed PCM data are decoded, and the decoding-resultant data are subjected to the audio signal processing. Basically, non-compressed PCM data are directly subjected to the audio signal processing. Proper change of parameters about the weighting process and the frequency band for the audio signal processing can optimize the sound quality improvement in accordance with a condition of deterioration in the original sound quality. The audio signal processing can be applied to non-compressed data in various file formats such as MP3, WMA, AAC, and Real Audio.

It should be noted that the up-sampling of audio data may be implemented at a stage before the sound quality improving section 24.

Advantages Provided by the Invention

Regarding an audio signal representing continuous wave of a relatively high intensity from the viewpoint of "half-wave", it is possible to optimize the weighting process and to prevent the occurrence of a feeling of sound distortion in hearing sense. Regarding an audio signal representing non-repetitive complicated wave from the viewpoint of "half-wave" which contains a lot of harmonics, it is possible to optimize the weighting process and to emphasize a feeling of resonance and a feeling of resolution and localization in hearing sense.

What is claimed is:

1. An audio signal processing apparatus comprising:
a first table having coefficients;
a second table having corrective values for correction of the coefficients in the first table, the corrective values being assigned to different sample numbers in at least two successive half-wave signal portions;
first means for detecting a sample number in a corrected-object half-wave portion of a digital audio signal and a sample number in a half-wave portion of the digital audio signal which precedes the corrected-object half-wave portion;
second means for selecting ones from the corrective values in the second table in accordance with the sample numbers detected by the first means;
third means for correcting the coefficients in the first table into correction-resultant coefficients in response to the corrective values selected by the second means; and
fourth means for correcting samples in the corrected-object half-wave portion of the digital audio signal in response to the correction-resultant coefficients generated by the third means.

2. A computer readable medium storing a computer program for audio signal processing in which a first table has coefficients, and a second table has corrective values for correction of the coefficients in the first table, the corrective values being assigned to different sample numbers in at least two successive half-wave signal portions, the computer program comprising the steps of:
a) detecting a sample number in a corrected-object half-wave portion of a digital audio signal and a sample number in a half-wave portion of the digital audio signal which precedes the corrected-object half-wave portion;
b) selecting ones from the corrective values in the second table in accordance with the sample numbers detected by the step a);
c) correcting the coefficients in the first table into correction-resultant coefficients in response to the corrective values selected by the step b); and
d) correcting samples in the corrected-object half-wave portion of the digital audio signal in response to the correction-resultant coefficients generated by the step c).

3. An audio signal processing apparatus comprising:
a first table having coefficients;
a second table having corrective values for correction of the coefficients in the first table, the corrective values being assigned to different sample numbers in at least two successive half-wave signal portions;
first means for detecting a sample number in a corrected-object half-wave portion of a digital audio signal and a sample number in a half-wave portion of the digital audio signal which precedes the corrected-object half-wave portion;
second means for selecting ones from the corrective values in the second table in accordance with the sample numbers detected by the first means;
third means for correcting the coefficients in the first table into correction-resultant coefficients in response to the corrective values selected by the second means;
fourth means for detecting a difference between a level represented by a sample of interest in the corrected-object half-wave portion of the digital audio signal and a level represented by a sample which immediately precedes the sample of interest;
fifth means for multiplying the difference detected by the fourth means and corresponding one of the correction-resultant coefficients generated by the third means to get a multiplication result; and
sixth means for adding the multiplication result generated by the fifth means to the level represented by the sample of interest to correct the sample of interest.

4. A computer readable medium storing a computer program for audio signal processing in which a first table has coefficients, and a second table has corrective values for correction of the coefficients in the first table, the corrective values being assigned to different sample numbers in at least two successive half-wave signal portions, the computer program comprising the steps of:
a) detecting a sample number in a corrected-object half-wave portion of a digital audio signal and a sample number in a half-wave portion of the digital audio signal which precedes the corrected-object half-wave portion;
b) selecting ones from the corrective values in the second table in accordance with the sample numbers detected by the step a);
c) correcting the coefficients in the first table into correction-resultant coefficients in response to the corrective values selected by the step b);
d) detecting a difference between a level represented by a sample of interest in the corrected-object half-wave portion of the digital audio signal and a level represented by a sample which immediately precedes the sample of interest;
e) multiplying the difference detected by the step d) and corresponding one of the correction-resultant coefficients generated by the step c) to get a multiplication result; and
f) adding the multiplication result generated by the step e) to the level represented by the sample of interest to correct the sample of interest.

* * * * *